United States Patent [19]

Williams et al.

[11] Patent Number: 5,430,835
[45] Date of Patent: Jul. 4, 1995

[54] METHOD AND MEANS FOR COMPUTER SYCHRONIZATION OF ACTIONS AND SOUNDS

[75] Inventors: Kenneth A. Williams, Bass Lake; Robert E. Heitman; Christopher F. Smith, both of Oakhurst, all of Calif.

[73] Assignee: Sierra On-Line, Inc., Bellevue, Wash.

[21] Appl. No.: 250,098

[22] Filed: May 26, 1994

Related U.S. Application Data

[63] Continuation of Ser. No. 656,297, Feb. 15, 1991, abandoned.

[51] Int. Cl.$^6$ .............................................. G06F 19/00
[52] U.S. Cl. .............................................. 395/154
[58] Field of Search ............... 395/152, 153, 154, 161; 345/122; 360/79; 40/457

[56] References Cited

U.S. PATENT DOCUMENTS

| | | | |
|---|---|---|---|
| 660,255 | 10/1900 | Kingma | 434/185 |
| 4,305,131 | 12/1981 | Best | 395/2 |
| 4,460,342 | 4/1989 | Mills | 434/185 |
| 4,617,645 | 10/1986 | Sprague | 365/45 |
| 4,641,253 | 2/1987 | Mastran | 395/154 |
| 4,642,710 | 2/1987 | Murtha et al. | 360/79 |
| 4,692,941 | 9/1987 | Jacks | 381/52 |
| 4,805,220 | 2/1989 | Sprague | 381/51 |
| 4,827,532 | 5/1987 | Bloomstein | 382/41 |
| 4,852,168 | 7/1989 | Sprague | 381/35 |
| 4,884,972 | 12/1989 | Gasper | 434/185 |
| 4,905,094 | 2/1990 | Pocock et al. | 395/154 |
| 5,111,409 | 5/1992 | Gasper | 395/152 |
| 5,119,474 | 6/1992 | Beitel et al. | 395/161 |

FOREIGN PATENT DOCUMENTS

1129640 8/1982 Canada .
2121587 12/1983 United Kingdom .
9005350 5/1990 WIPO .

OTHER PUBLICATIONS

"Interface I.O", MacWorld vol. 7 No. 10 (Oct. 1990) pp. 220–227.

Poor, A., "Turnkey Multimedia From IBM", PC Magazine vol. 9 No. 9 (May 15, 1990), pp. 157–169.
Tessler, F., "Hyperanimator 1.5", MacWorld vol. 6 No. 6 (Jun. 1989), p. 156 (summary only).
Johnston, S. J., "Sending Mac E-Mail with a Human Face", InfoWorld vol. 10 No. 49 (Dec. 5, 1988), p. 83 (summary only).

(List continued on next page.)

Primary Examiner—Mark K. Zimmerman
Assistant Examiner—N. Kenneth Burraston
Attorney, Agent, or Firm—Kolisch, Hartwell, Dickinson, McCormack & Heuser

[57] ABSTRACT

The invention includes a method of synchronizing actions and sounds for display on the visual display in a computer-system. The invention also includes a simulation including synchronized actions and sounds. Specifically, the method of synchronizing actions and sounds for display on a computer system having a visual display includes determining locations in a sound recording where predetermined actions are to be displayed, measuring the time that elapses when the sound recording is played from reference point to the locations in the sound recording where the predetermined actions are to be displayed, associating the predetermined actions with the locations in the sound recording where the predetermined actions are to be displayed, and saving the locations and their associated actions. The invented method of synchronizing actions and sounds on a visual display in a computer system includes playing the sound, determining when a predetermined amount of time of the sound has elapsed, and displaying the action on the visual display when the predetermined amount of time of the sound has elapsed. The simulation includes a sound recording, a mechanism for playing it, and a mechanism for measuring its elapsed time when it played; data defining predetermined actions; a mechanism to compare such elapsed time with time positions; and a mechanism to display the actions upon a predetermined relationship between the elapsed time and the time positions.

11 Claims, 9 Drawing Sheets

OTHER PUBLICATIONS

Milburn, K., "IBM's Storyboard Packages Animation, Video, and Sound", InfoWorld vol. 11 No. 49 (Dec. 4, 1989) pp. 79–80 (summary only).

Bagley, J. D. and Gracer, F., "Method for Computer Animation of Lip Movements", IBM Technical Disclosure Bulletin vol. 14 No. 10 (Mar. 1972), pp. 3039–3040.

Rosch, "PC Emcee Runs Shows by Remote Control", PC Magazine, vol. 7 No. 2 (Jan. 26, 1988), p. 38.

Moore, "Multimedia Presentation Development Using the Audio Visual Connection", IBM Systems Journal, vol. 29 No. 4 (1990), pp. 494–508.

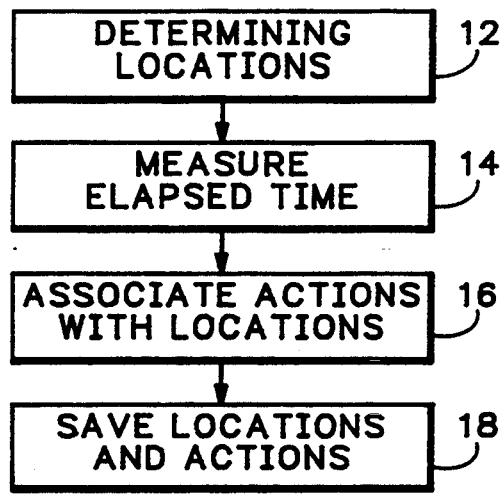
FIG. 1
Do you like to play computer games?
FIG. 3
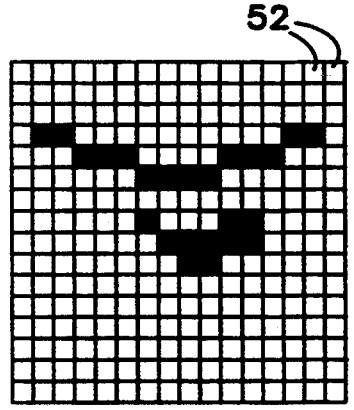
FIG. 5a
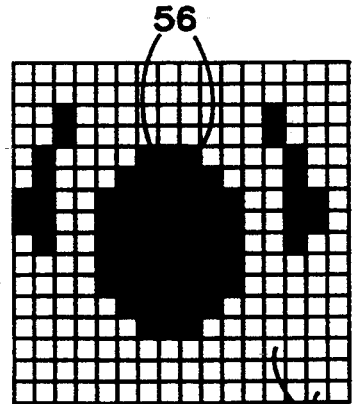
FIG. 5b
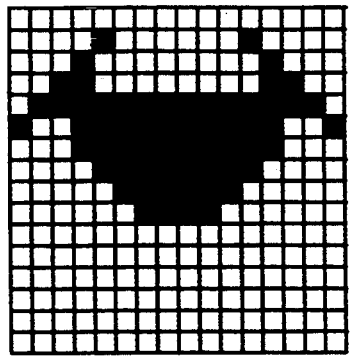
FIG. 5c

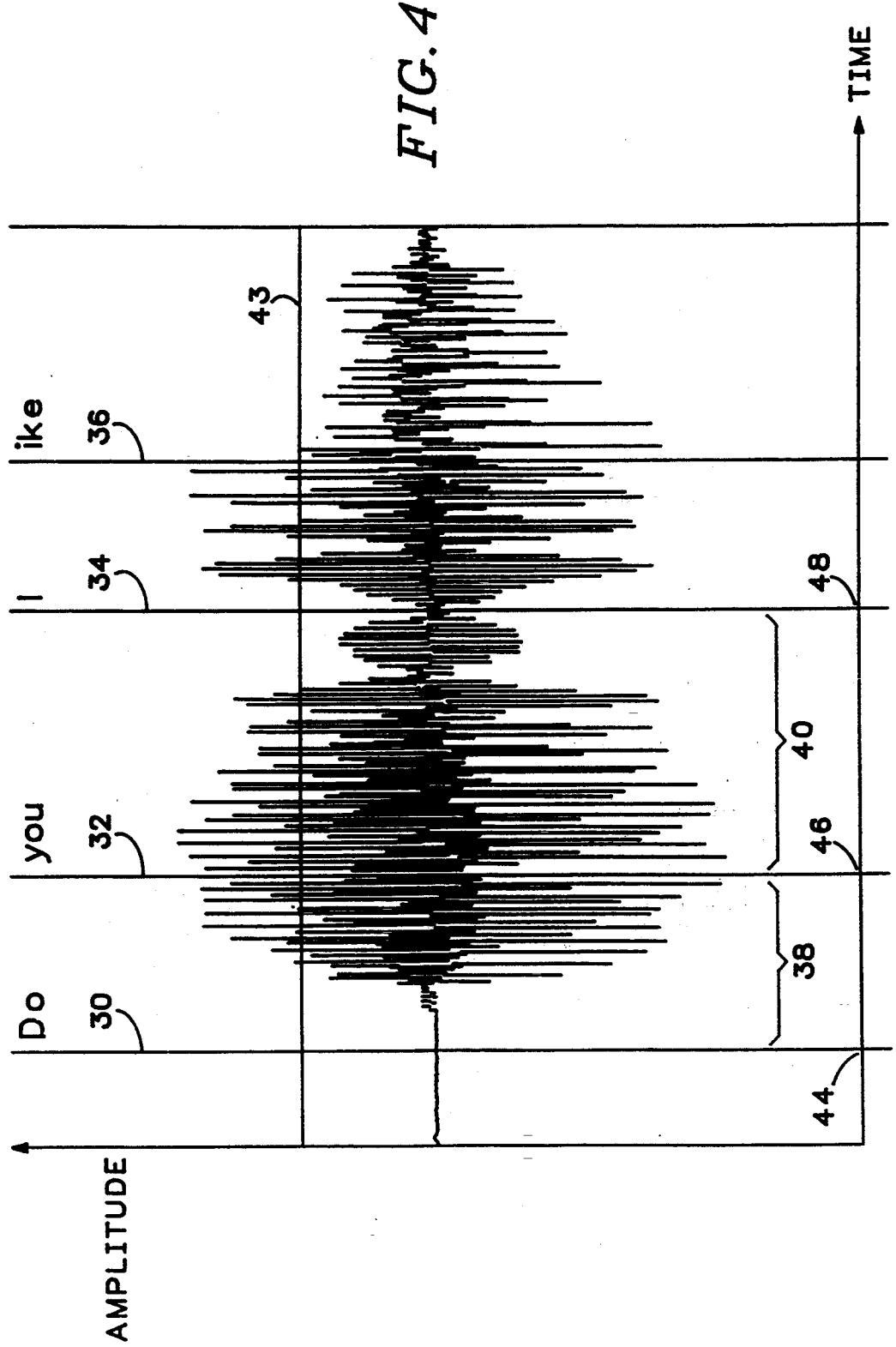

```
⎧  0:00.05   Do
⎪  0:00.15   you
⎪  0:00.30   l
⎪  0:00.38   ike
⎪  0:00.51   to
⎪  0:00.71   p
⎨  0:00.78   l
⎪  0:00.85   ay
⎪  0:00.95   com
⎪  0:01.13   pu
⎪  0:01.28   ter
⎪  0:01.45   games
⎩  0:02.00   ?
```

METHOD AND MEANS FOR COMPUTER SYCHRONIZATION OF ACTIONS AND SOUNDS

This is a continuation of application Ser. No. 07/656,297 filed Feb. 15, 1991 now abandoned.

TECHNICAL FIELD

This invention relates to computer animation and more particularly to the synchronization of actions and sounds in a computer simulation such as a video game.

BACKGROUND ART

Computer simulations are, broadly stated, computer ]programs. They are run on computer systems that often have a visual display and a sound generator. The simulation displays images on the visual display and produces sounds through the sound generator. The images and sounds depict the action of the simulation. A computer video game is an example of a simulation.

A simulation often includes one or more characters that perform certain actions in conjunction with certain sounds. For example, in a video game a character may move its mouth, change its facial expression or gesture when spoken words are produced by the sound generator. Synchronization is the coordination of actions and sounds so that they are displayed and produced at the appropriate times.

This invention synchronizes actions and sounds so that they can be displayed and produced by a computer system. The invention also includes a method of displaying the synchronized actions and sounds and a simulation including synchronized actions and sounds.

DISCLOSURE OF THE INVENTION

The invention includes a method of synchronizing actions and sounds for display on the visual display in a computer system and a simulation including synchronized actions and sounds. Specifically, the method of synchronizing actions and sounds for display on a computer system having a visual display determines locations in a sound recording where predetermined actions are to be displayed, measures the time that elapses when the sound recording is played from reference point to the locations in the sound recording where the predetermined actions are to be displayed, associates the predetermined actions with the locations in the sound recording where the predetermined actions are to be displayed, and saves the locations and their associated actions. The invented method of synchronizing actions and sounds on a visual display in a computer system plays the sound, determines when a predetermined amount of time of the sound has elapsed, and displays the action on the visual display when the predetermined amount of time of the sound has elapsed. The invented simulation includes a sound recording, means for playing the sound recording, means for measuring the elapsed time of the sound recording when it is played, data defining predetermined actions, time positions associated with the data for signalling when to display the actions, means to compare the elapsed time of the sound recording with the time positions, and means to display the actions when a predetermined relationship exists between the elapsed time and the time positions. The invention is particularly applicable for animating characters in a video game by causing the characters' mouths to move in synchronization with speech.

BRIEF DESCRIPTION OF THE DRAWINGS

FIG. 1 is a flow chart outlining the steps of synchronizing actions with sounds for future presentation by a computer system.

FIG. 3 is a textual representation of a speech sample that can be used in the method outlined in FIG. 2.

FIG. 4 is a graph illustrating the sound amplitudes of a portion of the speech sample represented textually in FIG. 3.

FIG. 5a–c show different mouth shapes that can be displayed on a visual display in a computer system and that can be used in the method outlined in FIG. 2.

DETAILED DESCRIPTION AND BEST MODE FOR CARRYING OUT THE INVENTION

The invented synchronization method coordinates actions and sounds so that they are displayed and produced by a computer system at the appropriate times. The invention is particularly applicable in animating characters in a video game so that their mouth movements and gestures are synchronized with a sound recording of speech.

There are two aspects involved with the invented synchronization method. First, data defining actions for display by a computer system must be associated with signals that tell a computer system when to display the actions. Second, after the data has been associated with a signal, it must be displayed on a visual display in synchronization with a sound recording.

FIG. 1 outlines the basic steps of associating actions with signals that tell when the action is to be displayed. Step 12 plays a sound recording and determines the locations in the sound recording where predetermined actions are to be displayed. Step 14 measures the time that elapses when the sound recording is played from a reference point to the locations in the sound recording where the predetermined actions are to be displayed. The reference point is often the beginning of the sound recording, but can also be any selected point in the sound recording or prior to the sound recording. The elapsed time of the sound recording can be calculated by dividing the length of the sound recording (from the reference point to the point where the time is measured) by the sample playback rate of the sound generator. For example, in a system using a digital to audio convertor (DAC) which plays at a given rate, the number of bytes of data fed to the DAC divided by the rate of play equals the elapsed time. The system clock of a computer system can also be used to calculate elapsed playback time. Step 16 associates the actions with the locations and step 18 saves them in a memory device. The memory device can be anything capable of storing data accessible by a computer system, such as a hard disk drive, floppy disks, tapes or compact disks.

Figure 2:
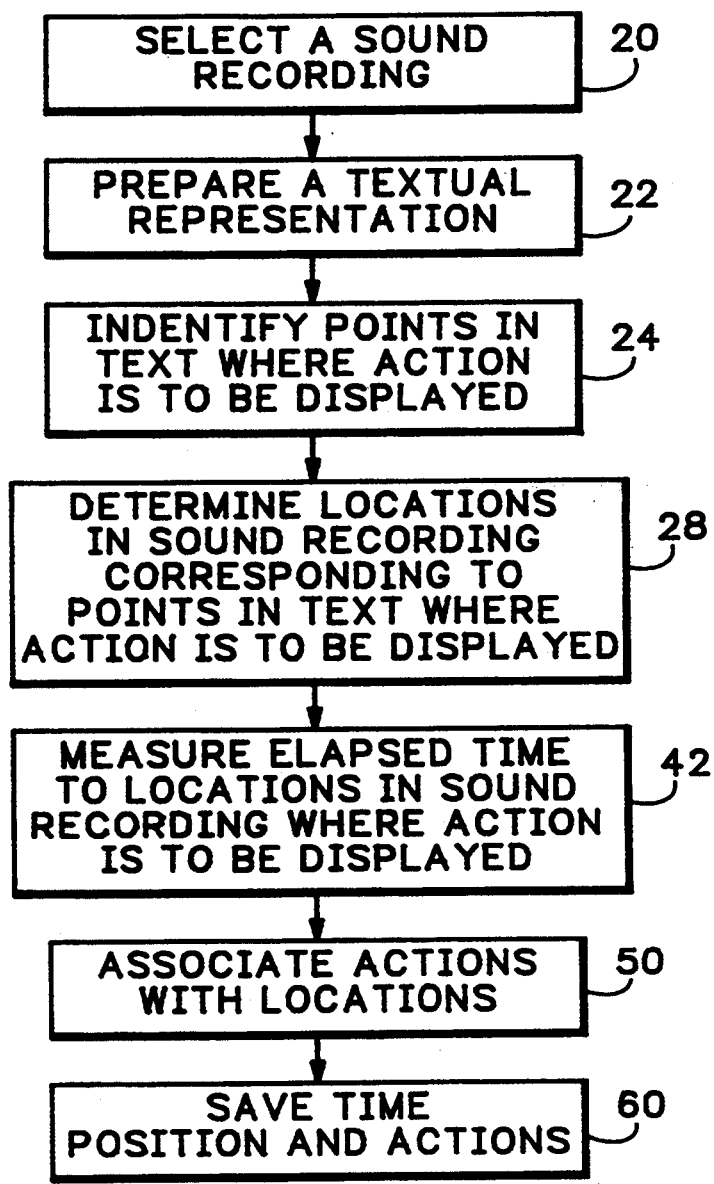
FIG. 2 is a more detailed flow chart outlining the steps of synchronizing actions with sounds for future presentation by a computer system.

FIG. 2 outlines a more detailed method of synchronizing actions and sounds. Initially, step 20 selects a sound recording. The sound recording can be music, speech, animal noises, or any other type of sound recording. Typically, the sound recording will be digitized and it may be stored on a compact disc read-only memory.

A textual representation of the sound recording is prepared at step 22. For example, if the sound recording includes the word "play", the textual representation would be the letters "p-l-a-y". If the sound recording is a lion roaring, the textual representation may be "rrrrroarrr". FIG. 3 shows a textual representation of the speech sample "Do you like to play video games? I do."

Step 24 in FIG. 2 identifies the points in the textual representation where action is to be displayed. In FIG. 3, the points where action is to be displayed are identified by blocks such as blocks 26. The blocks signal when a character's mouth position should change so that the character appears to speak. In other words, as the sound recording represented textually in FIG. 3 is played, the mouth position of a character on a visual display in a computer system will change where the sound recording plays the sounds associated with the blocked letters.

Returning to FIG. 2, step 28 determines locations in the sound recording that correspond to the points in the textual representation where action is to be displayed. For example, FIG. 4 shows a graph illustrating the sound amplitudes of the portion "Do you like" of the speech sample represented textually in FIG. 3. It illustrates the amplitude of the digitized sound over discrete intervals of time, as is known in the art. The speech sample graphed in FIG. 4 was played at 11 kHz.

The graph of FIG. 4 can be analyzed to determine the locations corresponding to the points in the textual representation of the sound where action is to be displayed. For example, the line at 30 in FIG. 4 represents the beginning of the word "Do" and corresponds to the letter "D" in FIG. 3. Line 32 in FIG. 4 identifies the letter "y" at the beginning of the word "you". Similarly, line 34 identifies the beginning of the letter "l" sound and line 36 identifies the beginning of the "i" sound. The sound between lines 30, 32, 34 and 36, such as block 38 or block 40 can be played by a sound generator in any known method to insure that the appropriate sounds are enclosed within the different blocks. In this manner, lines 30, 32, 34 and 36 can be adjusted to the right or left in FIG. 4 so that the exact locations of the letters blocked in FIG. 3 can be found.

In some cases a textual representation of the sound recording may not be needed or desired. In those cases, the points in the sound recording where action is to be displayed can be determined audibly without referring to a textual representation of the sound recording. For example, steps 22 and 24 in FIG. 2 can be deleted and step 28 can be changed to read "DETERMINE LOCATIONS IN SOUND RECORDING WHERE ACTION IS TO BE DISPLAYED". The method would then proceed from block 20 to block 28 directly.

Step 42 in FIG. 2 then measures the time between a reference point and the locations in the sound recording where actions are to be displayed. For example, the reference point in FIG. 4 would be the Y-axis labeled amplitude, and it can be positioned at any point in the sound recording. Typically, it is positioned at the beginning of the sound recording. The time from the Y-axis to line 30, which represents the beginning of the word "Do", is identified at point 44, the point where line 30 intersects the time axis of the graph. Similarly, point 46 in FIG. 4 identifies the amount of time that elapses in the sound recording before the word "you" is spoken. Point 48 identifies the amount of time in the sound recording that elapses before the sound associated with the letter "i" is produced. Points 44, 46 and 48 all represent time positions or locations in the sound recording that indicate when a character's mouth position should change.

Step 50 in FIG. 2 associates those time positions or locations with predetermined actions. For example, FIGS. 5a-c illustrate three different mouth positions of a character. FIG. 5a illustrates a closed mouth, FIG. 5b illustrates an open mouth that can be used when the "O" sound is played and FIG. 5c illustrates an open mouth that can be used when the "E" sound is played. Thus, at step 50 in FIG. 2, FIG. 5b could be associated with point 44 in FIG. 4.

FIGS. 5a-c are composed of picture elements called pixels, such as pixels 52 in FIG. 5a. Each different pixel can be lit, colored or shaded, as is known in the art. For example, the background pixels in FIG. 5b, such as pixels 54 can be skin color, while the pixels outlining the mouth, such as pixels 56 can be red or black.

Numerous other mouth positions can also be created, such as quarter-rotated views and side profiles. Each mouth position is defined by data stored in a computer system's memory device, and the data instructs the computer system which pixels to light, which to color, and which to shade. Alternatively, data defining other actions such as face changes, arm movements, a bird flying, or a candlestick appearing out of nowhere can all be used.

In step 50, the actions can be associated with the time, positions or locations in the sound recording either manually or automatically. If they are associated manually, the computer programmer determines which actions are associated with the different time positions. If the actions and time positions are associated automatically, different sound features or combinations of features, such as intensity, frequency, percussive or fricative sounds, can signal which actions should be associated with which time positions. The automatic association of actions and time positions may be performed by any appropriate program on a computer system.

For example, line 43 in FIG. 4 represents a predetermined amplitude. At time position 44, the sound is below line 43 and a computer program could automatically associate mouth position 5a with that time position. At time position 46, the sound amplitude is above line 43 and a computer program could associate mouth position 5b with time position 46. In that manner, different mouth positions can be associated automatically with different time positions based on the amplitude of the sound at the respective time positions. Thus, the selected parameters such as intensity and specific vocalized sounds can be analyzed automatically over time, and predetermined values of the selected parameters can determine the appropriate actions to be associated with the particular time position.

Figures 6, 7:
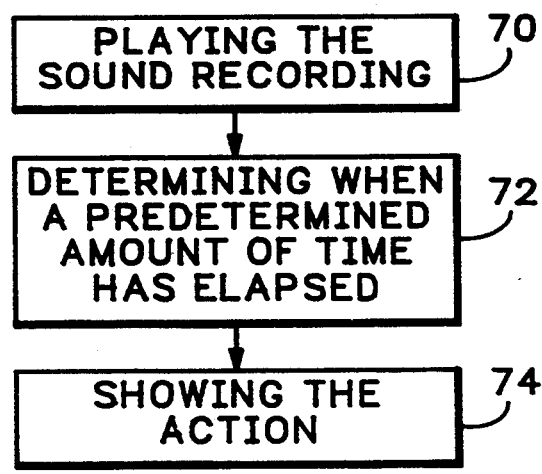
FIG. 6 is a table showing various time positions associated with points in the textual representation of FIG. 3.
FIG. 7 is a flow chart showing how an embodiment of the invention displays synchronized actions and sounds on a visual display in a computer system.

FIG. 6 associates the different letters blocked in FIG. 3 with their respective time positions. As can be seen, point 44 in FIG. 4 corresponds to the first time position listed in FIG. 6, 0.5 seconds. Point 46 in FIG. 4 corresponds to the second time position listed in FIG. 6, 0.15 seconds, and point 48 corresponds to the third time position listed in FIG. 6, 0.30 seconds. The time positions; are determined from the graph in FIG. 4 or from timing the sound recording when it is played.

Step 60 in FIG. 2 then saves the time positions and the actions associated with the time positions. In other words, step 60 saves the information shown in the table at FIG. 6. The time positions can be saved as a 16-bit value ranging from zero to 65535, where each number represents 1/60th of a second. Thus, a 16-bit value can signal a time position up to approximately 18 minutes. The time positions can also be saved in a signal having any number of bits and each bit can represent any length of time.

The actions also can be stored as a 16-bit value that identifies where the actual data defining the action is stored. The 16-bit value that identifies where the actual data defining an action is stored allows for different types of action. For example, every four bits in the 16-bit value can be used to identify different actions such as eye movements, mouth movements and arm movements. Thus, every four bits can be thought of as a channel. Alternatively, the 16-bit number identifying the data could indicate a series of predetermined images to be displayed on the computer screen such as a rapid opening and closing of the mouth. Of course, other methods of saving the time positions and actions can be used.

As described above, actions and sounds can be synchronized for display on the visual display of a computer system. Once the actions and sounds are synchronized and stored in a memory device, they can be accessed and displayed by a computer system.

FIG. 7 shows a simple flow chart outlining how the synchronized actions and sounds can be displayed. Step 70 starts playing the sound recording and step 72 determines when a predetermined amount of time of the sound recording has elapsed. When the predetermined amount of time has elapsed, step 74 shows the action on a computer system's visual display.

FIG. 8 is a detailed flow chart showing how actions and sounds synchronized according to the steps shown in FIG. 3 can be displayed. The method outlined in FIG. 8 is for a video game that displays characteristics on a visual display in a computer system. It animates the characters so their mouths move in synchronization with a speech recording.

At step 76, the video game is played until the course of the game requires a character to speak a particular speech sample. The speech sample is recognized at step 77 and the character's initial mouth position is set at step 78. The initial position is a predetermined position chosen by the game programmer. The order of steps 77 and 78 may be changed without significant effect.

At step 80 the method reads the first time position and action associated with the particular speech sample and step 82 begins playing the speech sample. While the speech sample is playing, step 84 looks to see if there was a time position and action associated with the speech sample. If not, the method proceeds to the steps following the label "A", shown at 85 in FIGS. 8a and 8b.

Figure 8A:
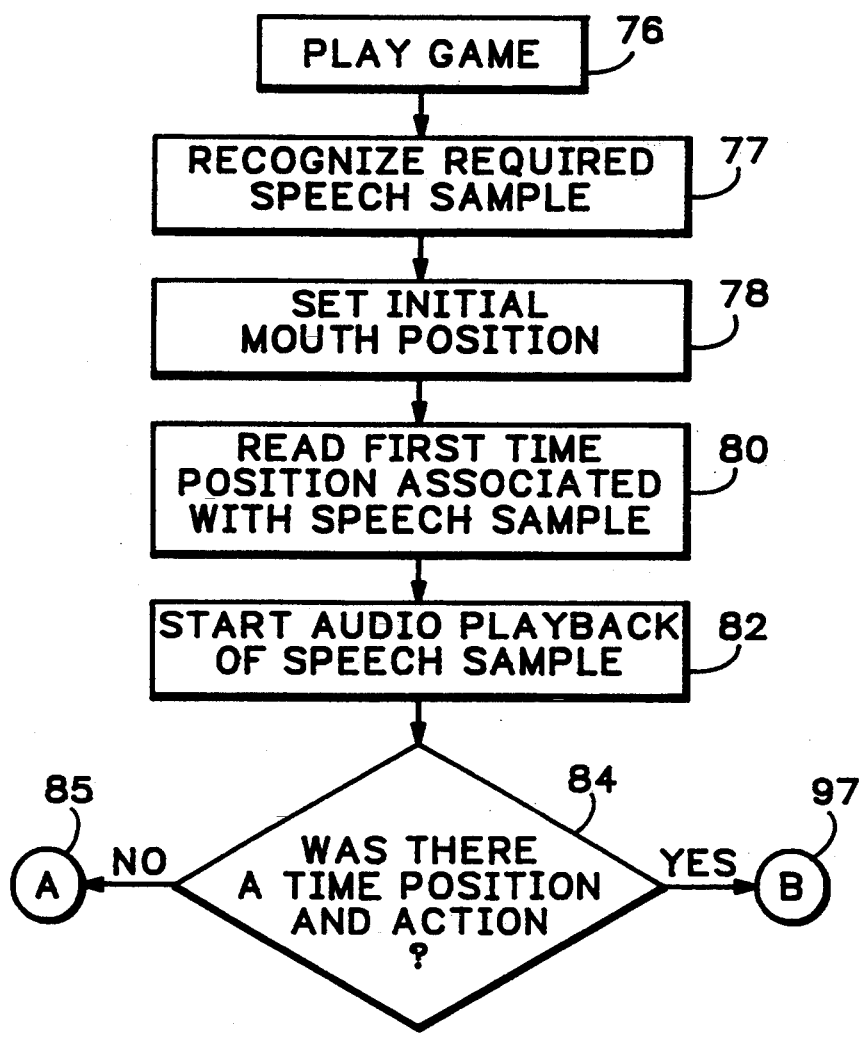
FIGS. 8a–d constitute a more detailed flow chart showing how an embodiment of the invention displays synchronized actions and sounds on a visual display in a computer system.
Figure 8B:
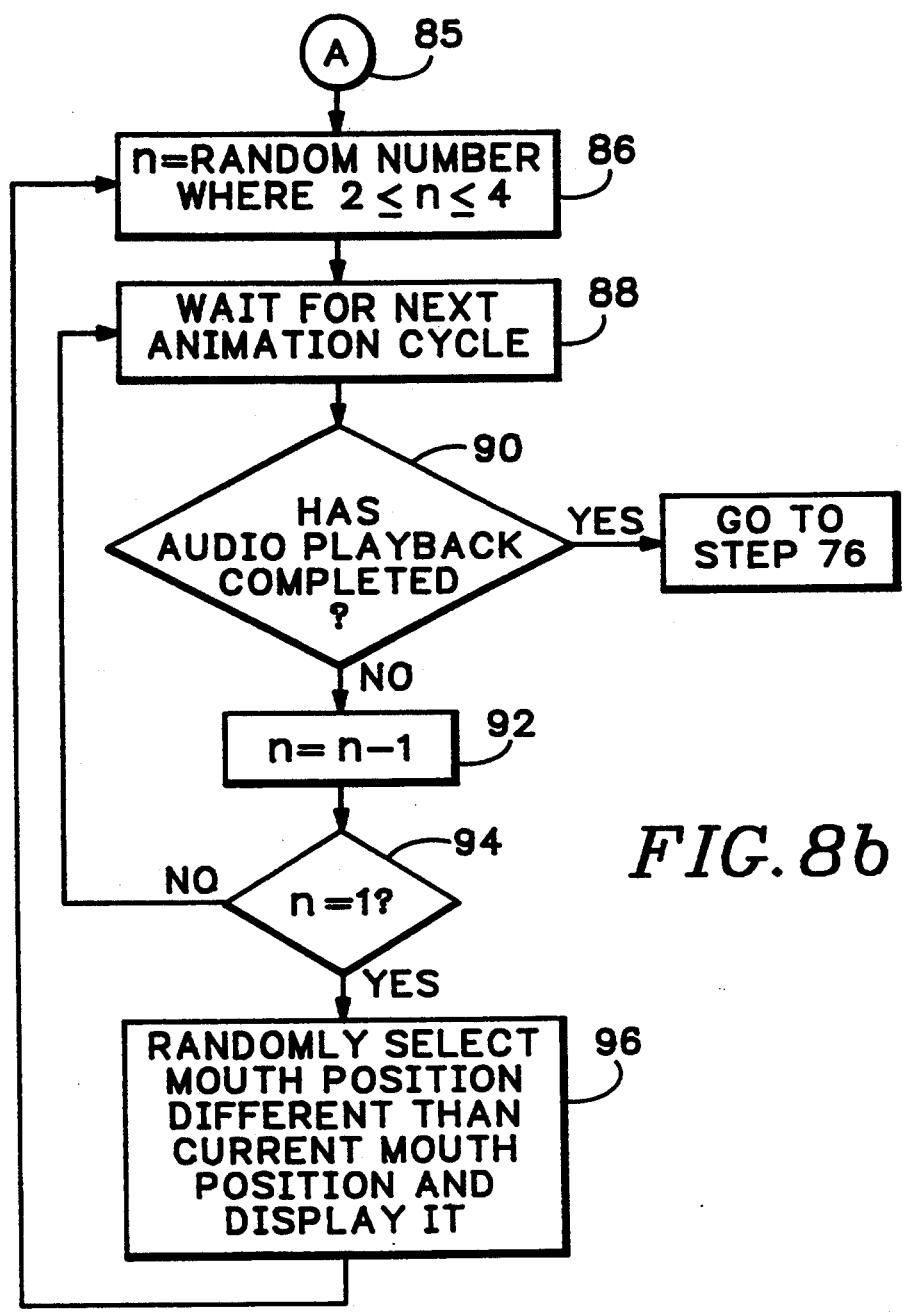

Step 86 follows label "A" in FIG. 8b and sets a variable "n" equal to a random number between two and four, inclusive. Step 88 then waits for the next animation cycle. The animation cycle is the amount of time between updates in the image on the visual display. In this example the visual display can be updated every 1/10th of a second. Typically, only the things that are changed on the display are updated each cycle.

Step 90 then asks whether the speech sample has finished playing, and if so, the method returns to step 76. If the speech sample is not finished playing, step 92 decrements "n" by one and step 94 inquires whether "n" equals one. If "n" does not equal one, the method returns to step 88. If "n" does equal one,,, the method proceeds to step 96 where it randomly selects one of the character's mouth positions, except the current mouth position. The new mouth position is then displayed on the visual display and the method returns to step 86.

Steps 86 through 96 are used when actions such as particular mouth movements have not been synchronized with particular sounds in the recording. This is often the case in video games when there is a foreign language sound recording such as Japanese. Those steps cause the mouth positions to change on the visual display, but they do not necessarily position the mouth for the particular sounds in the recording. The value of "n" in step 86 prevents the character's mouth position from changing every time the image is updated. It also inserts randomness into the mouth positions displayed, allowing for more realistic mouth movements when particular mouth positions have not been synchronized with particular sounds.

Figure 8C:
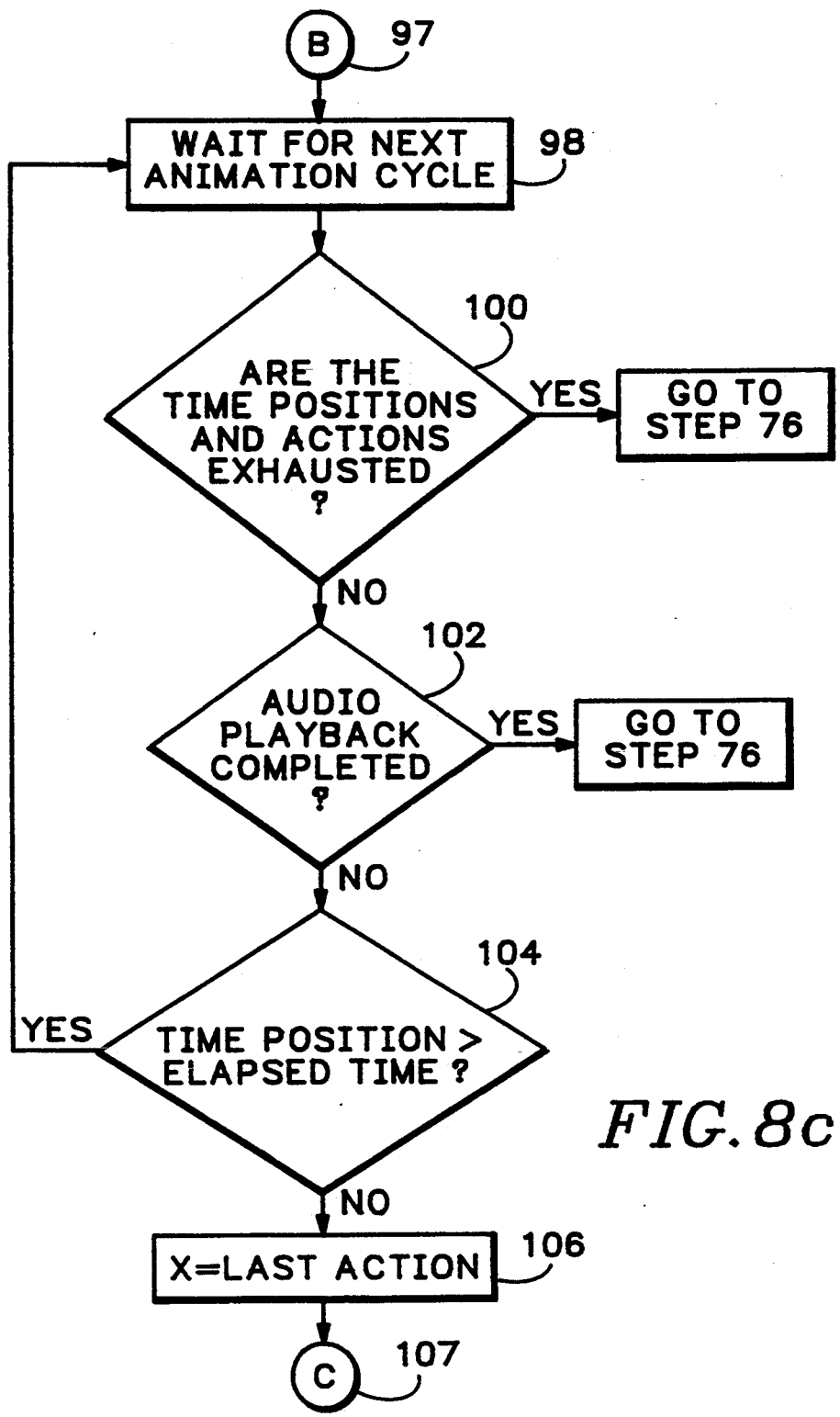

Returning to FIG. 8a, if step 84 determines that there are time positions and actions associated with the sound recording, then the method proceeds with the steps following the label "B" at 97 in FIG. 8c. Step 98 follows label "B" and causes the method to wait for the next animation cycle update. Step 100 then asks whether the time positions and actions associated with the sound recording have been exhausted. If so, the method returns to step 76. If not, the method determines whether the audio playback is completed at step 102 and returns to step 76 if it has. If the audio playback has not completed, step 104 identifies the elapsed time of the sound recording and determines whether the time position read at step 80 is greater than the elapsed audio playback time. If it is, the method returns to step 98. If not, step 106 sets a variable "X" to identify the last action read by the computer system. Obviously, the logic of step 104 can be changed so that it asks if the time position is less, than or equal to the elapsed time. In that case, a "yes" response would lead to step 106 and a "no" response would lead to step 98.

Figure 8D:
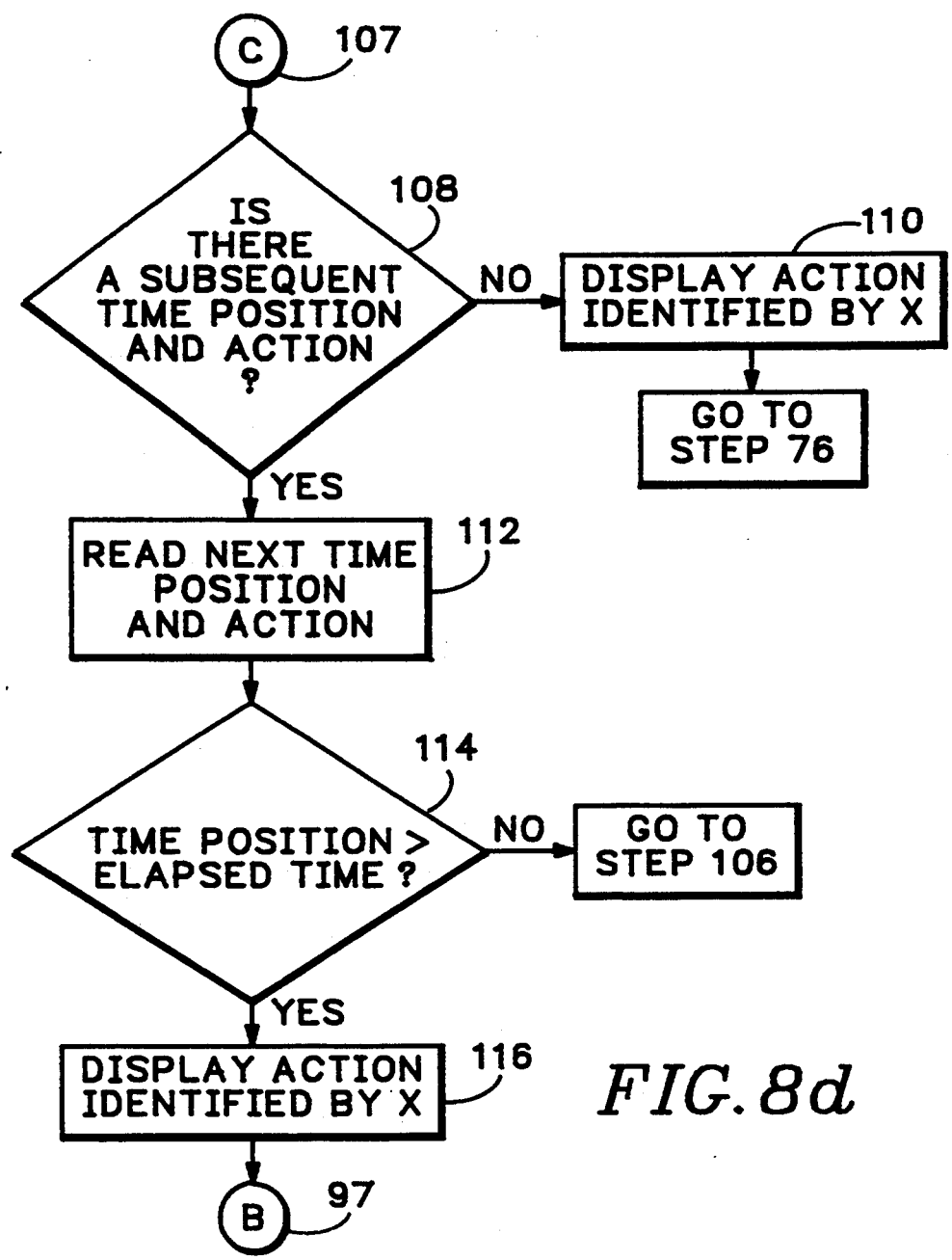

After step 106, the method performs the steps following the label "C" at 107 in FIG. 8d. Step 108 then inquires whether there is a subsequent time position and action. If not, the method displays the action identified by the number equal to the variable "X" at step 110 and returns to step 76. If there is a subsequent time position and action, they are read at step 112. Step 114 identifies the elapsed time of the sound recording and asks if the elapsed time is less than the time position read at step 112. If not, the method returns to step 106. If it is, step 116 displays the mouth position identified by variable "X" and the method returns to the steps following the label "B" at 97 in FIG. 8c. As with step 104, the logic of step 114 can be reversed.

Figure 9:
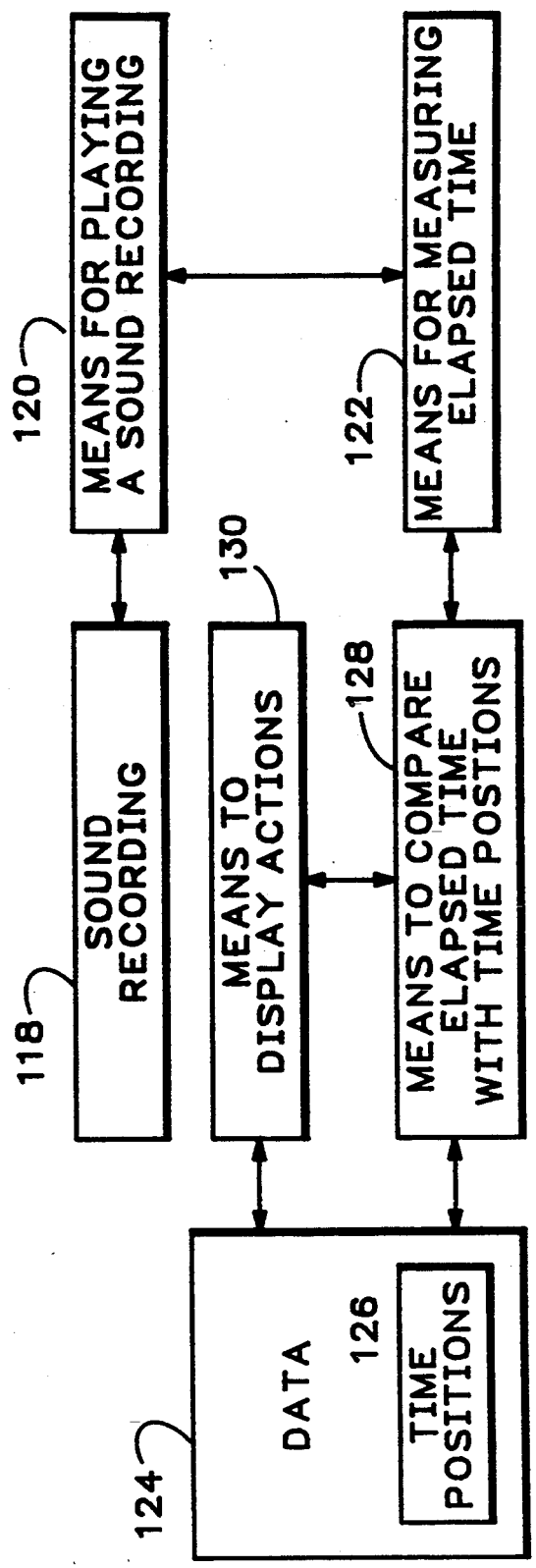
FIG. 9 is a block diagram showing the invented simulation.

The above-disclosed steps illustrate how a character in a video game can be animated so that the character's mouth, face and body movements are synchronized with a sound recording. FIG. 9 is a block diagram of a simulation that includes the above-disclosed steps. It is designed for play on a computer :system having a visual display and a sound generator.

The simulation shown in FIG. 9 includes a sound recording at 118. Typically, the sound recording is digitized and stored on a compact disc read-only memory. The simulation also includes a means for playing the sound recording 120 on a sound generator. The means for playing the sound recording on the sound generator can include a first set of code stored on the same compact disc read-only memory that houses the digitized sound recording. Block 122 represents a means for measuring the elapsed time of the sound recording when the sound recording is played, and it may include software that monitors the elapsed time of the sound recording when the sound recording is played on the sound generator. That software can also be stored on the same compact disc read-only memory that houses the digitized sound recording and the means for playing the sound recording. Data defining predetermined actions for display on a visual display is shown at 124 and time positions associated with the data for signalling when to display an action by the data on the visual display is shown at 126. Both the data and the time positions can be stored on the same compact disc read-only memory that houses the above-described elements. Block 128 shows a means to compare the elapsed time of the sound recording with the time positions associated with the data. The means to compare can include a third set of code also stored on the compact disc read-only memory that compares the elapsed time and the time positions. Block 130 shows a means to display the actions on the visual display when a predetermined relationship exists between the elapsed time and the time positions. It can include a fourth set of code also stored on the compact disc read-only memory that displays the actions on the visual display.

Industrial Applicability

The invented method and means for computer synchronization of actions and sounds is applicable in any situation where actions must by synchronized with sound recordings. It is particularly applicable in the video game industry where characters displayed on a computer system's video display are animated. While the preferred embodiment of the invention has been described other changes can be made without departing from the spirit of the invention.

We claim:

1. In a computer video game system having a sound generator and a visual display showing an image, a method of synchronizing actions of the image with a sound recording that has a given time duration, where each action is defined by data that is associated with a time position that signals when the action is to be displayed, the method comprising:
   reading a first time position associated with data describing a first action;
   playing the sound recording on the sound generator;
   determining the elapsed time of the sound recording;
   comparing the first time position with the elapsed time; and
   if the first time position is greater than the elapsed time, then waiting a predetermined period of time and repeating the method beginning with the step of determining; but
   if the first time position is less than or equal to the elapsed time, then performing the steps of
   recognizing a second time position associated with data, describing a second action;
   contrasting the second time position with the elapsed time; and
   if the second time position is greater than the elapsed time, then displaying the first action and repeating the method for subsequent time positions associated with data describing subsequent actions beginning with the step of determining; but
   if the second time position is less than or equal to the elapsed time, then repeating the method for subsequent time positions associated with data describing subsequent actions beginning with the step of recognizing.

2. The method of claim 1 where each time position indicates the amount of time of the sound recording that must elapse before the respective action is displayed.

3. The method of claim 1 where the step of displaying is also accomplished when there is no further data describing subsequent actions.

4. The method of claim 1 where the steps of waiting and repeating beginning with the step of determining are accomplished when there is further data describing subsequent actions and when there is further time remaining for the playing of the sound recording.

5. The method of claim 1 where the image is a character, the sound recording is a speech sample and the actions include mouth positions.

6. The method of claim 1 where the image is a character and the actions include character gestures.

7. In a computer video game having a sound generator for playing sound samples from a sound recording composed of a plurality of sound samples and a visual display for displaying an image, a method of synchronizing incorporation of an action in the image with the sound recording, where the action is selected from a predefined set of available actions, the method comprising:
   selecting one or more of the sound samples to synchronize;
   identifying a set of predetermined time locations in each of the selected sound samples where an action is to be incorporated in the image;
   associating a specific action with each predetermined time location;
   playing one of the sound samples on the sound generator;
   determining a current time location in the playing of the sound sample;
   if the sound sample is one of the selected sound samples, then:
   comparing the current time location with the predetermined time locations for the sound sample; and
   if the current time location is one of the predetermined time locations, then incorporating the associated specific action in the image; and if the sound sample is not one of the selected sound samples, then
   for at least one of the current time locations randomly selecting an action from the set of available actions and incorporating it in the image.

8. The method of claim 7 wherein, the actions are a character's mouth movements and the mouth movements are defined by mouth shapes stored in a memory device accessible to the computer video game.

9. The method of claim 7 wherein the image is an animated image having a characteristic animation cycle and the step of determining occurs once each animation cycle.

10. The method of claim 9 wherein the step of randomly selecting is carried out only if a specified number of animation cycles have passed since the last action was incorporated in the image.

11. The method of claim 9 wherein the step of randomly selecting is carried out only if a specified number of animation cycles have passed since the last action was incorporated in the image and the specified number of cycles is a randomly selected number between one and the number of animation cycles occurring during the sound recording.

* * * * *